(12) United States Patent
Page

(10) Patent No.: US 7,708,201 B2
(45) Date of Patent: May 4, 2010

(54) SYSTEM AND METHOD FOR VERIFYING THE AUTHENTICITY OF A CHECK AND AUTHORIZING PAYMENT THEREOF

(76) Inventor: Terri Page, 15842 SW. 10 St., Pembroke Pines, FL (US) 33027

( * ) Notice: Subject to any disclaimer, the term of this patent is extended or adjusted under 35 U.S.C. 154(b) by 0 days.

(21) Appl. No.: 11/981,559

(22) Filed: Oct. 31, 2007

(65) Prior Publication Data

US 2008/0091603 A1 Apr. 17, 2008

Related U.S. Application Data

(63) Continuation-in-part of application No. 11/900,214, filed on Sep. 10, 2007, now abandoned, which is a continuation of application No. 11/358,511, filed on Feb. 21, 2006, now Pat. No. 7,267,264, which is a continuation of application No. 10/973,933, filed on Oct. 26, 2004, now Pat. No. 7,000,831, which is a continuation-in-part of application No. 10/270,860, filed on Oct. 15, 2002, now Pat. No. 6,808,109, which is a continuation-in-part of application No. 09/458,974, filed on Dec. 10, 1999, now Pat. No. 6,464,134.

(51) Int. Cl.
*G06K 15/00* (2006.01)
*G07F 19/00* (2006.01)
*G06Q 40/00* (2006.01)

(52) U.S. Cl. .......................... 235/383; 235/379; 705/39

(58) Field of Classification Search .................. 235/383, 235/379; 705/16, 39
See application file for complete search history.

(56) References Cited

U.S. PATENT DOCUMENTS

| | | | |
|---|---|---|---|
| 4,321,672 A | 3/1982 | Braun et al. |
| 5,023,782 A | 6/1991 | Lutz et al. |
| 5,044,668 A | 9/1991 | Wright |
| 5,175,682 A | 12/1992 | Higashiyama et al. |
| 5,457,305 A | 10/1995 | Akel et al. |
| 5,679,938 A | 10/1997 | Templeton et al. |
| 5,781,654 A | 7/1998 | Carney |
| 5,890,141 A | 3/1999 | Carney et al. |

(Continued)

FOREIGN PATENT DOCUMENTS

FR 2 558 622 7/1985

*Primary Examiner*—Thien M. Le
*Assistant Examiner*—April A Taylor
(74) *Attorney, Agent, or Firm*—Malloy & Malloy, P.A.

(57) ABSTRACT

A system and method for verifying the authenticity and payment of a bank check at any of a plurality of banks or check cashing sites, wherein a payor or issuing site determines a first set of data including account and individualized payee data, which is communicated to a processing center for temporary storage and eventual comparison. Upon presentation of the check for redemption, the cashing site will establish a second set of data at least including the pre-printed account data and, depending on the embodiment, the individualized payee data that appears on the face of the check when presented. The second set of data is communicated to the processing center where the first and second sets of data are compared. Subsequent to comparison, authenticating data will be communicated to the cashing site, which is indicative of redemption authorization or refusal. Additional embodiments include assuring payment for and delivery of merchandise associated with an Internet commercial transaction.

10 Claims, 6 Drawing Sheets

U.S. PATENT DOCUMENTS

| | | |
|---|---|---|
| 5,896,298 A | 4/1999 | Richter |
| 5,897,625 A | 4/1999 | Gustin et al. |
| 5,936,219 A | 8/1999 | Yoshida et al. |
| 6,036,344 A | 3/2000 | Goldenberg |
| 6,038,553 A | 3/2000 | Hyde, Jr. |
| 6,073,121 A | 6/2000 | Ramzy |
| 6,164,528 A | 12/2000 | Hills et al. |
| 6,181,814 B1 | 1/2001 | Carney |
| 6,464,134 B1 | 10/2002 | Page |
| 6,536,659 B1 * | 3/2003 | Hauser et al. ............... 235/375 |
| 6,808,109 B2 | 10/2004 | Page |
| 7,000,831 B2 | 2/2006 | Page |
| 7,004,382 B2 | 2/2006 | Sandru |
| 7,267,264 B2 | 9/2007 | Page |
| 7,379,899 B1 * | 5/2008 | Junger ........................ 705/24 |
| 7,383,227 B2 | 6/2008 | Weinflash et al. |
| 7,455,226 B1 * | 11/2008 | Hammond et al. .......... 235/385 |
| 2001/0039534 A1 | 11/2001 | Keene |
| 2002/0066042 A1 * | 5/2002 | Matsumoto et al. ......... 713/202 |
| 2004/0153402 A1 * | 8/2004 | Smith et al. ................... 705/39 |
| 2005/0035193 A1 * | 2/2005 | Gustin et al. ................ 235/379 |
| 2008/0054064 A1 | 3/2008 | Page |

* cited by examiner

SYSTEM AND METHOD FOR VERIFYING THE AUTHENTICITY OF A CHECK AND AUTHORIZING PAYMENT THEREOF

CLAIM OF PRIORITY

The present application is a continuation-in-part application of a previously filed, now application having Ser. No. 11/900,214, filed on Sep. 10, 2007; now abandoned which is a continuation application of a previously filed, now application having Ser. No. 11/358,511, filed on Feb. 21, 2006; which matured into U.S. Pat. No. 7,267,264 on Sep. 11, 2007, which is a continuation application of a previously filed application having Ser. No. 10/973,933, filed on Oct. 26, 2004; which matured into U.S. Pat. No. 7,000,831 on Feb. 21, 2006, which is a continuation-in-part application of a previously filed application having Ser. No. 10/270,860, filed on Oct. 15, 2002; which has matured into U.S. Pat. No. 6,808,109 on Oct. 26, 2004, which is a continuation-in-part application of a previously filed application having Ser. No. 09/458,974, filed on Dec. 10, 1999 which matured into U.S. Pat. No. 6,464,134 on Oct. 15, 2002.

BACKGROUND OF THE INVENTION

1. Field of the Invention

This invention relates to a system and method for verifying the authenticity of a bank check at the time the check is presented for deposit or cashing, by comparing both the account data and the individualized payee data appearing on the face of the check with account data and individualized payee data added to the check, at the time the check was issued. A positive comparison comprises the content of the first and second sets of data being identical, and results in a verification of authenticity of the check and an authorization to pay, while the detection of any differences between the first and second sets of data will result in a non-verification signal being communicated to the site where the check is presented for deposit or cashing.

2. Description of the Related Art

As early as 1993, the American Bankers Association and the National Retail Federation sponsored an inter-industry task force, known as the Bank Check Fraud Task Force, for the purpose of examining a variety of possible solutions to the ever increasing problem associated with check fraud. The task force developed, among other solutions, a data sharing program for closed accounts. This program is designed to prevent people, who have outstanding checks due to retailers, from opening new accounts. For example, participating financial institutions report all checking accounts closed, for cause, to a central data base called Checks Systems. This central data base transmits the closed account information to the shared check authorization network (SCAN) data base. Participating banks use the SCAN information before opening new accounts, to detect repeat offenders. A participating bank can also use MICR information from a check presented with the applicant's driver's license number to check the SCAN file for any previous bad account activity.

Other attempts to solve the problems of check fraud include electronic check presentment, which is an electronic/paper method of expediting check collection. Participating banks exchange check payment information before physically presenting the checks for payment. The depository bank captures payment information from the MICR line of incoming checks and immediately transmits the information electronically to the paying bank. Later, the depository bank sends the actual check according to its normal paper deadline. During check posting, the paying bank identifies checks that should be returned and immediately notifies the depository bank. Supporters of this system believe that it speeds up processing, controls cost and reduces fraud by providing early notification of return items.

Another preventative measure directed to the avoiding of losses from fraudulent check presentation includes "positive pay", which allows a company and its bank to work together to detect check fraud by identifying items presented for payment that the company did not issue. In the typical case, the company electronically transmits to the bank a list of all checks issued on a particular date. The bank verifies the check received for payment against that list and pays only those items on the list. The system further allows the bank to reject checks that exceed a specific dollar amount or checks that carry dates that have long past (stale checks). The bank investigates rejected checks to find out if the items are fraudulent or in error. The bank only pays exception items which are approved directly by the issuing company.

Yet another preventive measure is termed "reverse positive pay" and is similar to "positive pay" but comprises a somewhat reversed processed. In practice, the issuing company, rather than the bank, maintains a list of the checks issued on a given date or over a given period. When the checks are presented for payment and clear through the Federal Reserve System, the Federal Reserve prepares a file of the check's account number, serial number and dollar amount and sends the file to the bank. The bank then sends the file to the issuing company, and the company compares the information received from its bank with its internal records. The company then informs the bank as to which checks match its internal information and the bank pays only those verified check items. Subsequently, the bank researches the checks that do not match, corrects any misreads or encoding errors, and determines if any items are fraudulent. The bank pays only "true" exceptions that can be reconciled with the company's files.

While the attempts, of the type set forth above are primarily applicable to prevent check fraud at the institutional level, there is still a need to protect the payor as well as retail establishments, at the retail level. More specifically, there is a need for a system designed and structured to protect companies or other payors, against check fraud, when the checks are subsequently presented for redemption at any of a large number of the banks or check cashing agencies. It is of course recognized that one or more systems do exist, wherein the bank, check cashing agency, or retail establishment use conventional telephone communication with a central data base for purposes of determining if adequate funds are available to cover the check presented. However such a system, while most applicable for use by certain retail establishments, does not protect against attempts to fraudulently alter either the payee or the value of the check. Also, known systems of the type set forth above are time consuming, and not particularly useful when a bank or other cashing agency is presented with a large number of checks over a short period of time, such as in the case of payroll checks.

Accordingly, there is a need in this area for a system and accompanying method to easily, quickly and efficiently accomplish verification of the authenticity of checks at the time the check is presented for payment or deposit. Such an improved system should be capable of withholding authorization for payment of the check until individualized payee data, comprising payee identification and value of the check, is compared with and accurately corresponds to the payee identification and value of the check, as intended and as originally printed on the bank check by the issuing company or payor. Such an improved system and method should also be capable of taking advantage of modern day computer and electronic communication facilities and thereby significantly reduce or eliminate any delay in accomplishing verification of check authenticity and authorization for payment at the site where the check is presented for deposit or cashing. In addition, such an improved system and accompanying method may also include communication with a central data system of the type associated with the existing automatic teller machine (ATM) networks for purpose of isolating or suspending funds of the payor in an amount at least equivalent to the value of the checks being issued.

SUMMARY OF THE INVENTION

The present invention is directed towards a system and an accompanying method for the processing of bank checks or other negotiable instruments in a manner which eliminates or significantly reduces the problems associated with check fraud. Check fraud of the type referred to herein includes, but is not limited to, alteration of the check by changing the payee and/or the value of the check from that originally intended by the person or company that issued the bank check. The system and method of the present invention, while particularly adaptable for use by companies periodically issuing a relatively large number of checks, such as payroll checks, is also readily adaptable for use in the prevention of check fraud involving personal checks which may be typically presented for redemption or for payment of goods or services at a retail establishment.

More specifically, an individual, company or other entity representing the payor includes at least one terminal, hereinafter referred to as an "issuing terminal", which comprises sufficient processing capabilities to store and integrate various data. The issuing terminal further includes input facilities preferably in the form of both a scanner assembly, which may comprise an optical scanner or other electronic reader, and a manual keyboard. In addition, a printer may be associated directly with the issuing terminal, so as to produce receipts and/or hard copies of the information or data regarding the one or more checks issued. It is emphasized that for purposes of clarity, the system and method of the present invention will be described with regard to the preparation and processing of a single bank check. However, it should be obvious that any number of such bank checks could be identically processed, such as when a company is preparing a number of payroll checks for any given pay period.

In initially preparing to issue a check, personnel at the issuing terminal preferably optically scan or electronically read the pre-printed account data appearing on the check, wherein such account data normally includes an account number, check number, bank routing number, etc. Along with the account data, individualized payee data is entered into the issuing terminal, either manually, such as by using the associated keyboard or by any other applicable means. Alternatively, the issuing terminal and the associated scanner assembly can be structured and/or have sufficient capabilities to also electronically read or identify the individualized payee data, which would be printed on the face of the bank check by computer, printer or other known or specifically modified hardware, such as by establishing a direct link or integral configuration between the issuing terminal of the present invention, and the facilities, such as a specific payroll software program, which are provided for the generation of the checks and/or account record keeping. In this situation the keyboard and associated printer, while available for other functions, would not be required to manually enter the aforementioned individualized payee data from the face of the check, as the initial entry and/or generation of the information for initial placement on the check can also serve to enter the information into the issuing terminal. It should also be noted that the issuing terminal could include scanning equipment, as part of its associated scanner assembly, which is structurally designed to function in a manner similar to the equipment used to "swipe" credit cards, and need not be an elaborate computer processor system. By virtue of such scanning techniques, both the account data as well as the payee data could be integrated into the processor and memory of the issuing terminal electronically, utilizing the scanning equipment having such "swipe" capabilities, and if necessary an associated key pad. Whether automatically or manually entered into the issuing terminal, the individualized payee data preferably includes the identity of the payee as well as the dollar amount or intended value of the bank check. Once entered, the processing facilities at the issuing terminal and the associated memory thereof, would serve to integrate the account data with the individualized payee data and thereby establish what may be referred to as a first set of data.

Once established, the first set of data is communicated by any applicable means to a processing center typically located remote from the issuing terminal. The processing center includes sufficient processing and computer facilities to accomplish at least initial or temporary storage of the first set of data for later processing in a manner which will assure the absence of check fraud, as will be explained in greater detail hereinafter.

At least one of a preferably large number of "cashing terminals" is preferably located at a number of different banks, check cashing agencies and other establishments, including retail establishments, where the bank check may be presented for redemption. The cashing terminal also preferably includes sufficient input facilities to establish what may be referred to as a second set of data. The second set of data is more specifically defined by both the account data as well as individualized payee data, which appears on the face of the check being presented for redemption. Using the cashing terminal, personnel to whom the bank check was presented for redemption, would enter the account data, preferably by optically scanning or otherwise electronically reading the pre-printed account data appearing on the bank check. In addition, at least a portion of the individualized payee data would also be entered, preferably manually through the use of a keyboard, keypad or like facilities, wherein the customized payee data entered would include at least the dollar amount or value appearing on the face of the check. Accordingly, once the account data, and at least a portion of the customized payee data, is integrated into the cashing terminal, thereby establishing the aforementioned second set of data, the second set of data would be communicated to the processing center. Once received by the processing center, a central processing unit or other processing facilities, remote or integral with the cashing terminal and/or issuing terminal would perform a comparison process between the content of the first set of data received from the issuing terminal and the content of the second set data received from the cashing terminal. A positive comparison would comprise the content of both the first and second sets of data being identical, in that the account data as well as at least the value of the check and possibly the identification of the payee appearing on the face of the check presented for redemption, would identically correspond to the same information which defines the first set of data supplied to the processing center by the issuing terminal. To the contrary, a negative comparison would result when, for example, the individualized payee data appearing on the face of the check presented for redemption has a value greater than or different from the value of that check supplied by the issuing terminal and initially stored in the processing center prior to comparison. The computer or processing facilities at the processing center would then generate either a verification signal or non-verification signal, which would be communicated directly to the cashing terminal. Upon receipt of a verification signal, personnel at the site of the cashing terminal would be authorized to redeem the check in terms of allowing its deposit, or exchanging it for cash. However, the receipt of a non-verification signal would prevent authorized redemption of the presented check and require further processing either by the processing center or the personnel at the site where the cashing terminal is located.

Yet another preferred embodiment of the system and method of the present invention comprises a modification of the content of the first set of data, which is determined at the issuing terminal or site and the second set of data, which is determined at the issuing terminal or site. As with the above described preferred embodiment, the first set of data preferably includes account data and payee data. However, the second set of data generated at the cashing terminal or site may comprise only the account data of the bank check when presented for redemption. The account data defining the second set of data can be determined and/or generated by optically or electronically reading the account data appearing on the bank check. This account data, defining the second set of data, is communicated to the central processing center and the central processing unit associated therewith. The account data defining the second of data is then compared with only a portion of the first set of data; namely the account data on the bank check as determined as being part of the first set of data previously communicated to the processing center. When the account data of the second set of data is identical to the account data of the first set of data the result will be a positive comparison. A negative comparison will result when the account data of the second set of data is not identical to the account data portion of the first set of data.

Subsequent to the comparison of the first and second sets of data, as set forth above, the processing center and the central processing unit associated therewith will communicate "authenticating data" to the cashing terminal or site. The authenticating data is "variable" at least to the extent that the content thereof will vary depending upon the determination of a positive comparison or a negative comparison between the first and second sets of data. Accordingly, the authenticating data, upon the determination of a positive comparison between the account data of the first and second sets of data will comprise at least a portion of the payee data. More specifically, upon determination of a positive comparison, the monetary amount of the check and/or the identity of the payee of the check, as determined at the issuing site, will be communicated to the cashing site. Once received at the cashing site, the communicated portion of the payee data will be compared with a corresponding portion of the payee data appearing on the bank check when it is presented for redemption. If the amounts are identical, personnel at the cashing site will thereby be authorized to redeem the check for cash or deposit. Naturally, discrepancies between the monetary value of the bank check or the identity of the payee of the bank check as determined at the issuing site, from those portions of the payee data appearing on the bank check when presented for redemption at the cashing site, will result in a refusal to redeem the bank check.

The absence of a requirement to include the payee data in the second set of data will facilitate the processing of the check at the cashing site or terminal. More specifically, personnel at the cashing site or terminal will not be responsible for entering, reading, generating, etc. any portion of the payee data appearing on the bank check. Instead, a direct comparison with the portion of the payee data communicated from the processing site, defining the authenticating data, with a corresponding portion of the payee data appearing on the bank check at the time of redemption, can be quickly and easily accomplished.

Additional features of the system and method of the present invention, applicable for use with each of the above described preferred embodiments, may include the issuing of an individual access code to the company or other entity representing the payor. In addition to other features associated with the access code, to be described hereinafter, the access code can be used to link the payor and the payor's checks to the processing center. By way of example, in situations where a check was presented by a cashing terminal to the processing center that resulted in a negative comparison, either the processing center or the site of the cashing terminal at which the check was presented could contact the personnel at the issuing terminal or issuing site and request specific authorization by requesting both specific account data and individualized payee data of a given check number. In doing so the authenticity of the information provided by the issuing company or payor could be verified by first receiving and accepting the aforementioned identifying access code, which is representative of the payor. Use of the access code may also occur in specialized situations when, for example, one or more bank checks properly issued by the payor were inadvertently not registered with the processing center. Accordingly, data relating to an "unregistered" check presented by a cashing terminal to the processing center would result in a negative comparison, since there would be no record of the check being issued. Verification of a valid issued check could therefore be accomplished through use of the identifying access code as set forth above.

In addition to the above, the implementation of the system and method of the present invention may also include communication with a central data system such as, but not limited to, the type associated with the various automatic teller machine (ATM) networks existing throughout the country. In operation, upon completion of the issuing of the one or more bank checks by the issuing terminal, the first set of data, including both the account data and at least a portion or all of the individualized payee data, would be communicated to the central data system. The central data system would thereafter suspend or isolate funds in an equal amount to the value of the issued check. Similarly, when a check is presented for redemption and payment or deposit of the check is authorized, communication could be received from either the site of the cashing terminal or alternately from the processing center to debit the amount of the redeemed check from the suspended or isolated funds. Other data associated with the individual redeemed check could also be registered and stored in memory for subsequent communication to the issuing terminal or payor including check number identification of the payee, etc. The suspension or isolation of the funds from the account on which the one or more bank checks are drawn would further serve as security against check fraud, in that any check presented for redemption and drawn on an account of the payor would not be debited against the suspended or isolated funds, unless such check was first registered with the processing center in accordance with the system and method of the present invention, as set forth above.

Additional modifications are also contemplated and may be included in certain preferred embodiments of the system and method of the present invention. Such additional modifications include situations where the check being prepared at the issuing terminal includes portions of the data, particularly the payee data, which are not specifically determined. By way of example, the issuer can insert the amount on the check as "an amount not to exceed $250.00". Two possible alterations can occur when a portion of the payee data has been deemed to be "not to exceed, etc". The first alteration can be to increase the amount, for example; from $250.00-$500.00. The second alteration can be to change the payee data to an exact amount. However, once the exact amount has been input it cannot be altered again. Once the amount changes from "an amount not to exceed, etc." to an exact amount, it cannot be altered thereafter. Related modifications may include the inclusion on the bank check of a specific or determined amount wherein the payee identity has not yet been established. For example, the payee may be indicated as "cash". In such an instance the user can add the payees name at a later date when the information becomes available. Alternatively, the assignment of the check can remain as cash. When the bank check is presented at the cashing terminal it would indicate whether it was assigned to "cash" or whether the payee identification information has been entered at the issuing terminal.

Yet other modifications included in the system and method of the present invention contemplates that certain bank checks can be cancelled out of the system. Again by way of example, if a check is misplaced, or stolen, the payor can cancel the check at the issuing terminal. If the payor has access to the Internet the check can be cancelled on the appropriate website or through customized and authorized accounting/check writing software. The system can be used to cancel a check and issue a new check but not alter the existing information on a previously issued check. The issuer will be able to communicate with the processing center and cancel the given check. However, the issuance of a new check will have to either be done manually at the issuing terminal or by computer software. Similarly, the system further includes "stop payment" procedures. When a check is entered at the cashing terminal, appropriate personnel will be notified that a stop payment order has been issued for that check, preferably but not necessarily by communicating the order to the processing center. Also in any of the above embodiments and/or modifications, a check can be post dated, when it is prepared at the issuing terminal. As is commonly practiced, the bank check can not be cashed or otherwise redeemed until the established date.

Further, and preferably as practiced with all of the included preferred embodiments and modifications of the present invention, once the first set of data has been established and communicated to the processing center, the amount or payee identification information can not be altered. An exception to this would be instances, as set forth above, where it is determined that the amount is not to exceed $250.00, etc. and/or where the payee identification data indicates the assignment of the check is to cash. Moreover, if it is determined at the cashing terminal that a legitimate check was not registered such as by the first set of data not being communicated to the processing center, the first set of data can be re-transmitted from the issuing terminal. In such instances, none of the existing account or payee data can be altered.

Additional modifications which are contemplated in the system and method of the present invention include activities and procedures of the cashing terminal. Such modifications include, by way of example only, that personnel at the one or more cashing terminals will be assigned an authorized access code. Authorized personnel when entering the system would then be required to log in the authorized access code in order that procedures relating to the system and method of the present invention can be performed.

If a check has been damaged and is unable to be scanned optically, electronically, etc., the cashing terminal will be able to input manually certain portions or all of the data appearing on the bank check. Such data may include routing number, account number, check number as well as manually inputting the payee identification information and/or monetary value or amount of the bank check. When a positive comparison has been determined such as at the processing center, the check will be canceled out of the system. This will ensure that no duplicate checks with the same information can be cashed.

Additional modifications contemplated by the system and method of the present invention may include the occurrence of a negative comparison at the cashing terminal. If it is determined that the bank check has not been entered into the system and is not fraudulent, the personnel of the processing center can communicate with the payor/issuing terminal by means of e-mail text messaging, etc. If the payor receives a text message, response can be made by re-transmitting the first set of data to the processing center. If the payor is contacted by telephone the appropriate access code of the payor would be entered preferably by inputting it into the issuing terminal and/or the telephone keypad. After the proper payor access code has been established, personnel of the processing center can convey to the payor, the appropriate data of the check. At that time, the payor/issuer can agree that the information being conveyed is correct and thereby authorize the check to be redeemed. If the issuer/payor is notified by e-mail of the failure to register the first set of data at the processing center, the payor/issuer can use a secured website to correct the problem by re-transmitting the first set of data of the bank check in question. For security reasons verbal conveyance of an access code of the payor to the processing center, while possible, is not recommended.

Yet additional preferred embodiments of the present invention are directed to a method and system for assuring payment for and receipt of merchandise in a commercial transaction between a customer and a vendor such as, but not limited to, a commercial transaction conducted over the Internet or other communication network. As typically, but not exclusively, practiced the method and system may involve a merchandising company or entity which is operative to advertise for sale various merchandise over the Internet or other communication network to a plurality of customers. As such, the customer is provided pertinent information of the merchandise to be purchased by accessing the merchandising company over the Internet and conducting at least a portion of the commercial transaction through merchandising company. Such a merchandising company may be, but is not limited to, the type commonly and commercially known as "eBay™".

As with the additional preferred embodiments described herein, this additional embodiment of the present invention incorporates the use of a central data system individually or in cooperation with a processing center as more fully described herein. As such, the processing center and the central data system, collectively and/or individually, depending upon the specific mode of application, will be referred to as a verification center. More specifically, the central data system is structured for communication with a payment processing entity, such as a bank, credit card company, etc. Further, the central data system and/or additional components of the verification center are cooperatively structured to be operatively interactive with the payment processing entity for the purpose of "isolating" a monetary amount derived from a payment medium offered by the customer as payment for the merchandise. The isolated funds or monetary amount will correspond to the purchase price of the merchandise (and possibly any service fee, etc. associated with the commercial transaction) purchased from the vendor independently or through the merchandising company, as set forth above.

It being stated that the payment processing entity may comprise a bank, credit card company or like processing facility, the customer will utilize a payment medium preferably in the form of a credit instrument including but not limited to a credit card, debit card, gift card, etc. Such a credit type payment medium will be traditionally processed for payment such that the monetary amount at least equal to the purchase price will be credited or otherwise transferred to the vendor. As such, the interactive operation between the verification center and/or central data system is such as to isolate and thereby delay payment of the monetary amount at least corresponding to the purchase price to the vendor, until all terms of the commercial transaction have been completed.

In the alternative, if the customer rejects the merchandise for any of a variety of valid reasons the isolated monetary amount will be returned to the customer upon return of the merchandise to the vendor in a timely manner. Of further note is that the verification center including the processing center and/or the central data system is not directly responsible for the processing of the payment medium, such as the credit card, debit card, etc. Accordingly the interactive operative features between the payment processing entity and the verification center is for the purpose of isolating the predetermined monetary amount which corresponds to the purchase price and specifically the verification center does not serve to process the credit card or other payment medium.

Therefore, the method practiced in accord with the attendant system assures payment for and receipt of merchandise in a commercial transaction between a customer and a vendor. In practice, the customer communicates an intent to purchase predetermined merchandise as well as a payment medium to the vendor preferably, but not necessarily, through the merchandising company. Such communication is established utilizing a predetermined communication network such as, but not limited to, the Internet. The vendor then communicates to the verification center, the intended arrival date of the merchandise to the customer. Subsequently, the verification center serves to isolate a monetary amount corresponding to the purchase price of the merchandise from the payment medium offered by the customer to the vendor or to the merchandising company.

One additional and distinguishing feature of the system and method of this preferred embodiment of the present invention is the establishment of the predetermined time period in which the customer must either accept or reject the merchandise. By way of example only, the predetermined time period may be a prearranged or predetermined to be a plurality of consecutive days extending from the date of receipt of the merchandise by the customer. Such a plurality of consecutive days may be a five day period during which the customer must communicate either the acceptance or rejection of the merchandise which the customer has received. The verification center and/or payment processing entity are thereby operatively structured to release the isolated monetary amount of funds to the vendor if the customer accepts the merchandise within the predetermined period of time.

Alternatively, if the customer fails to either accept or reject the merchandise within the predetermined period of time, the isolated monetary amount will still be forwarded to the vendor. Therefore, the customer assumes the responsibility of either rejecting or accepting the merchandise within the predetermined period of time. Absent such a rejection of the merchandise communicated to the vendor or the merchandising company, the isolated monetary amount will still be forwarded to vendor for payment.

However, if the customer rejects the merchandise in a timely manner and within the predetermined period of time, the isolated funds will then be released by the verification center and/or more specifically, the central data system and returned to the customer, provided that the merchandise has been returned in good and/or in an original condition to the vendor.

These and other features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
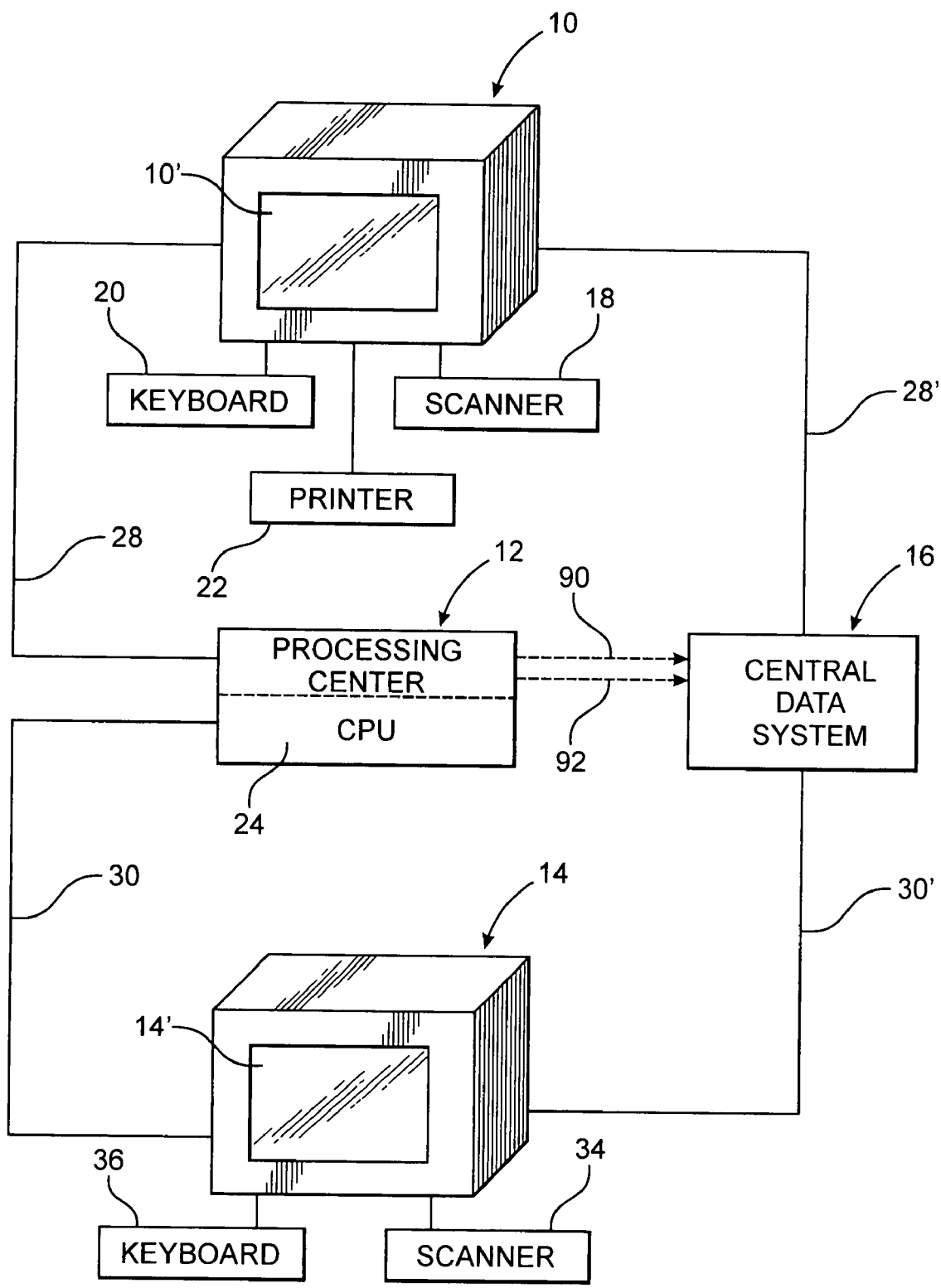
FIG. 1 is a schematic representation depicting an embodiment of the facilities utilized in the performance of the system and method of the present invention.

With reference to the accompanying Figures, the system and method of the present invention includes the use of an issuing terminal generally indicated as 10, which is representative of one or more terminals located at different issuing sites. Although an individual may have an issuing site, such as when utilizing a personal computer, the issuing site is preferably the location of a payor company or other entity and/or the location of an authorized payroll company, retained by the payor to issue a plurality of checks, such as but not limited to payroll checks. The system and method of the present invention also preferably includes access to a processing center, generally indicated as 12, which is typically remote from the issuing site at which the issuing terminal 10 is located.

A cashing terminal, generally indicated as 14, is further included in the system and method of the present invention. The cashing terminal 14 is representative of what may be an extremely large number of cashing terminals, which may be located at a plurality of different sites, all of which are most probably remote from both the issuing terminal 10 and the processing center 12. The cashing terminal 14, by way of example only, may be located at a bank or check cashing agency where the bank check, prepared and issued from the issuing terminal 10, is presented for redemption in terms of being deposited or cashed. Additionally, the cashing terminal 14 may be representative of a large number of such terminals located at various retail establishments, which would be willing to accept the bank check as payment for goods or services. For the purposes of this description, a bank check may include an institutionally issued check, one issued directly from a bank, a personal check, and various types of bonds, including bearer bonds and/or other types of negotiable instruments.

In addition to the above, the system and method of the present invention may also include communication with a central data system generally indicated as 16. The central data system 16, if included, may include, but not be limited to, the type normally associated with automatic teller machine (ATM) networks, found throughout the United States and most industrialized countries, as will be explained in greater detail hereinafter.

The issuing terminal 10 preferably includes sufficient processor and memory/storage capabilities to at least temporarily store and integrate data relating to the one or more bank checks prepared and issued thereby, and if desired can be integrated directly with a check processing and/or accounting computer by which the checks are normally issued. In preparing and issuing bank checks, the issuing terminal 10 preferably includes a first input facility, such as comprising a scanner assembly 18, and/or an integrated or remote connection to an accounting computer. The scanner assembly 18 can be in the form of an optical scanner or other reader designed and structured to electronically read the pre-printed account data found on the face of the bank check. The scanner assembly 18 may assume a variety of other forms including, but not limited to, a "swipe" scanner generally of the type used to read the magnetic strip on credit cards. A swipe-type scanner would be structurally modified to read at least the account data pre-printed on the face of the check and also could be structurally adapted to scan and electronically read the printed, individualized payee data as well if it has been entered in a machine readable form. Such pre-printed account data normally includes the payor's account number, a bank routing number and check number, as well as other possible information. Of course, the first input facility associated with the issuing terminal may also include a keypad or keyboard 20 of somewhat conventional design, which allows data to be manually entered into the processing and storage capabilities of the issuing terminal 10 if direct connection is not available at the point of issuance. More specifically, the keyboard 20 may, under some circumstances, be used for the manual entry of individualized payee data associated with each of the plurality of bank checks being prepared. The keyboard 20 would be used to input the individualized payee data in circumstances where such payee data was not automatically printed in typical fashion, such as by computer facility or the like, and a link between the issuing terminal and the printing or accounting computer is not established. Preferably, the payee data includes at least the name or other identification of the payee and/or the dollar amount or value of the check. Along these lines, the issuing terminal 10 preferably includes a printer or like printing facility 22, so as to produce any desired hard copy records of any data entered into and stored in the memory facilities of the issuing terminal 10 relating to the one or more checks being processed.

The processing center 12, which may be a part of or remote from the issuing terminal 10 and/or the cashing terminal 14, is preferably computer oriented and includes a central processing unit or like facilities 24 having the ability to receive data from a plurality of different sources, at least temporarily store and readily access such data, specifically but not exclusively for purposes of comparing various sets of data, at least in terms of corresponding content. More specifically, and as explained in greater detail with reference to FIG. 2, a first set of data relating to a particular bank check issued by the issuing terminal 10 and communicated and stored in the processing center 12, would be compared, as to its content, with a second set of data, received from the cashing terminal 14, and relating to the same bank check, when such bank check is presented for redemption at the site of the cashing terminal 14. Accordingly, the processing center is capable of communication with the issuing terminal 10, as at 28 and the cashing terminal 14, as at 30.

Also in an alternative embodiment of the present invention the communication facilities of the processing center 12 may be capable of communicating instructions and/or data information over first and second communication links 90 and 92 to the central data system 16, as will be explained in greater detail hereinafter. Communication between the processing center 12 and the issuing terminal 10, cashing terminal 14 and/or the central data system 16, may take place by conventional communication facilities including, but not limited to, telephone line communication such as that used for credit card verification. In addition to the conventional communication facilities such as an individual call based telephone communication, as set forth above, communication between the processing center 12 and in particular the issuing terminal 10, can be accomplished by network communication, such as a private and/or public network communication system. When using network communication, data presented to the processing center 12, at least including information relating to which previously issued checks have or have not been redeemed, as well as other informative data, could be accessed over the network system link, also represented as 28, such as preferably utilizing a secure and/or encrypted connection. Such a network communication link 28, would allow personnel at the issuing terminal or other personnel authorized by the payor to find out whether a specific check has been verified and authorized for payment, as well as a particular location or site of the cashing terminal 14 where an individual check was redeemed. Naturally, the issuing terminal 10 could also be accessed to obtain and/or transmit such information, which would be communicated to the processing center 12 for storage, upon completion of each check verification or non-verification by virtue of the existence of the network communication link 28. Likewise, in such an embodiment, the information on the check could include routing information wherein the cashing terminal 14 communicates directly with the issuing terminal 10, the processing center being directly associated therewith, with each issuing terminal 10 defining its own processing center.

In at least one preferred embodiment of the present invention, the cashing terminal 14 also preferably includes sufficient processing and/or storage facilities to adequately process, in the manner intended, the various data input from a second input facility, including a scanner assembly 34 and/or a manually operable keyboard 36. The scanner assembly 34 may be similar to scanner assembly 18, in that it may be in the form of an optical scanner, electronic reader and/or "swipe" scanner designed and structured to identify or read the pre-printed account data appearing on the face of the check, which is presented for redemption at the cashing site, such as the bank, check cashing agency, etc. as set forth above. The scanner assembly 34 located at each of the plurality of cashing terminals 14 could also be structured to electronically scan or read the payee data appearing on the check. The keypad or keyboard 36 may be connected for manually inputting all or at least a portion of the individualized payee data, which appears on the front of each of the bank checks presented for redemption in situations where the payee data is not scanned or electronically read. Therefore, in at least one preferred embodiment the cashing terminal 14 and more specifically the processing facilities associated therewith, would integrate the account data, as well as the individualized payee data, electronically or manually input into the terminal 14. The integration of the account data and the individualized payee data would therefore represent and establish what may be termed a second set of data.

The first set of data, having been communicated over communication facilities 28 to the processing center 12, would preferably be pre-stored, at least on a temporary basis. The first set of data would not need to be accessed until the second set of data is received over communication facility 30, from the cashing terminal 14. Other features associated with both the issuing terminal 10 and the cashing terminal 14 could include display facilities as at 10' and 14' associated with each of the terminals respectively, such that any of a plurality of signals or data generated by the processing center 12 could be readily communicated to the respective terminals directly and displayed on the display facility 10' or 14'.

Figure 2:
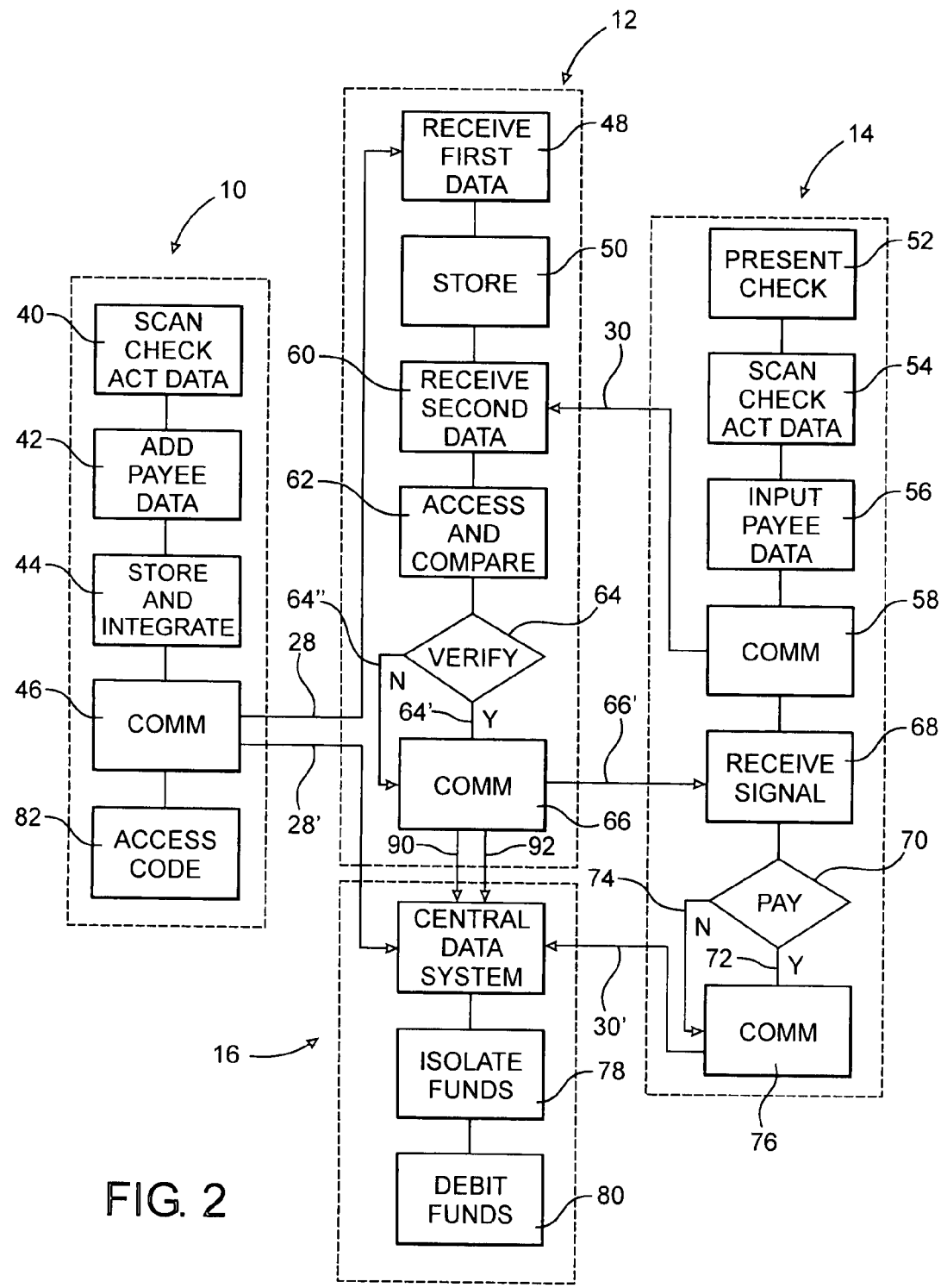
FIG. 2 is a flow chart schematically representing the various procedures in the performance of one preferred embodiment of the system and method of the present invention.

With reference to the preferred embodiment of FIG. 2, the verifying and authorizing system and method of the present invention is described with regard to the preparation and processing of a single bank check. It is again emphasized that the system and method of the present invention is of course structured to handle a plurality of such checks, utilizing one or more issuing terminals 10, at least one processing center 12 which may or may not be remotely located and a large number of cashing terminals 14 most probably, but not necessarily, located remotely from the issuing terminal 10, the processing center 12, and the geographical location of the central data system 16.

More specifically, in the preparation of a bank check, personnel at the issuing site, where the issuing terminal 10 is located, first inputs the account data appearing in pre-printed form on the face of the bank check being prepared as at 40, by optically scanning or otherwise electronically reading such account information utilizing the scanning assembly 18 or other facilities, as set forth above. The individualized payee data, including at least the monetary value of the check and name or identification of the payee, is added as at 42 to the processor of the issuing terminal 10, using the first input facility, such as the keyboard 20. However, if the payee data has been previously printed on the bank check automatically, using conventional computer facilities or other appropriate equipment, such individualized payee data may also be electronically scanned using any of a number of scanning assemblies 18, structurally capable of electronically reading both the account data as well as the payee data. The account data and the individualized payee data are then integrated into the storage and/or memory facility as at 44, so as to establish what may be referred to as a first set of data. This first set of data is then communicated as at 46 to the processing center 12, wherein the CPU 24 thereof receives the first set of data as at 48 and at least temporarily stores such data for later access, as at 50. In certain instances, where the bank check is prepared by software application, the above described scanning procedure may not be needed to extract and communicate the first set of data.

Subsequently, the bank check is presented for redemption at a cashing site such as a bank, check cashing agency, retail establishment, etc. where at least one cashing terminal 14 is preferably located. Of course, a manual communication (telephone call) of the data, if present in a manually readable form on the check can also be accomplished to the processing center 12. Preferably, however, when the check is presented as at 52, the account data appearing on the face thereof is optically scanned or otherwise electronically read or manually entered, so as to input such data into the processing and storage facility of the cashing terminal 14. The individualized payee data appearing on the presented check is also input either using keyboard 36, as at 56 or using the second scanner assembly 34. Further, at least a portion of the payee data, such as the monetary value of the check may be entered more than once, such as twice.

When so entered correctly, the check will be considered authentic. In the preferred embodiment of FIG. 2, the integration into the processing facilities of the cashing terminal 14, of both the account data and the individualized payee data, which appears on the face of the presented bank check, thereby serves to define and establish what may be termed a second set of data. The second set of data, once established, is then communicated as at 58, using applicable communication facilities 30, to the processing center 12. The second set of data is received as at 60 at the processing center 12, wherein the CPU 24 of the processing center 12 serves to access the previously stored first set of data and directly compare, as at 62, the content thereof with the second set of data received from the cashing terminal 14. Access to the first set of data of any given bank check can be readily accomplished by the CPU 24, due to the matching of the account data at least in terms of identity of the payor as well as the number of the bank check. The comparison as at 62 of first and second sets of data associated with any one bank check will result in the CPU 24 generating either a verification signal 64' or a non-verification signal as at 64". The generation of a verification signal 64' will result when a positive comparison is made to the extent that the content of the first and second sets of data identically correspond. However, a negative comparison results in the generation of a non-verification signal 64" when the content of the first and second sets of data do not identically correspond, thereby indicating a possibility of check fraud. By way of example, if a bank check is presented at the cashing terminal 14, wherein a value of the check or the identification of the payee thereon has been altered, the CPU 24 at the processing center 12, will be programmed to generate a non-verification signal 64", since the content of the first and second sets of data would not be identical.

Subsequent to the comparison as at 62, the CPU 24 will generate either the verification signal 64' or the non-verification signal 64", which will be communicated, as at 66 and 66' to the cashing terminal 14 and received as at 68. The generated verification signal 64' will be displayed at 14' on the cashing terminal 14 and the personnel there will have an authorization of payment as at 70 resulting in redemption of the check as at 72. If a non-verification signal is generated as at 64" it is communicated as at 66, 66' to the cashing terminal 14 and payment or redemption of the presented check as at 74 will be prevented.

As set forth above, communication between the issuing terminal 10 and the processing center 12 may be by network communication, wherein data entered and processed in terms of individual bank checks presented for redemption at any one of a plurality of cashing terminals 14, would be immediately accessible at the site of the issuing terminal 10 or another dedicated site. This would allow personnel at the issuing terminal 10 or at another site of the payor to immediately determine whether any given check, which has been previously issued, has been presented for redemption and also clearly indicate the location and/or identification of the site in terms of identifying the cashing terminal 14 where the presented check was verified and authorized for payment.

With regard to communication with the central data system 16, at least a first communication 28' may exist between the issuing terminal 10 and the central data system 16, wherein the first set of data or at least a portion thereof is communicated to the central data system 16 for purposes of suspending or isolating funds from the account on which the bank check is drawn at least equal to the amount or monetary value of the check. Such communication is also indicated in FIG. 2 as 28'. Upon receipt of at least a portion of the first set of data, the central data system will serve to separate or isolate the funds as at 78. Subsequently, when the bank check presented at the cashing terminal 14 has been verified as to its authenticity and payment has been authorized as at 72, the cashing terminal 14 or at least personnel at the site thereof, may also communicate with the central data system 16 as at 30', wherein the amount or value of the bank check presented at the cashing terminal 14 would be debited as at 80, from the funds which have been previously suspended or isolated as at 78.

Figure 3:
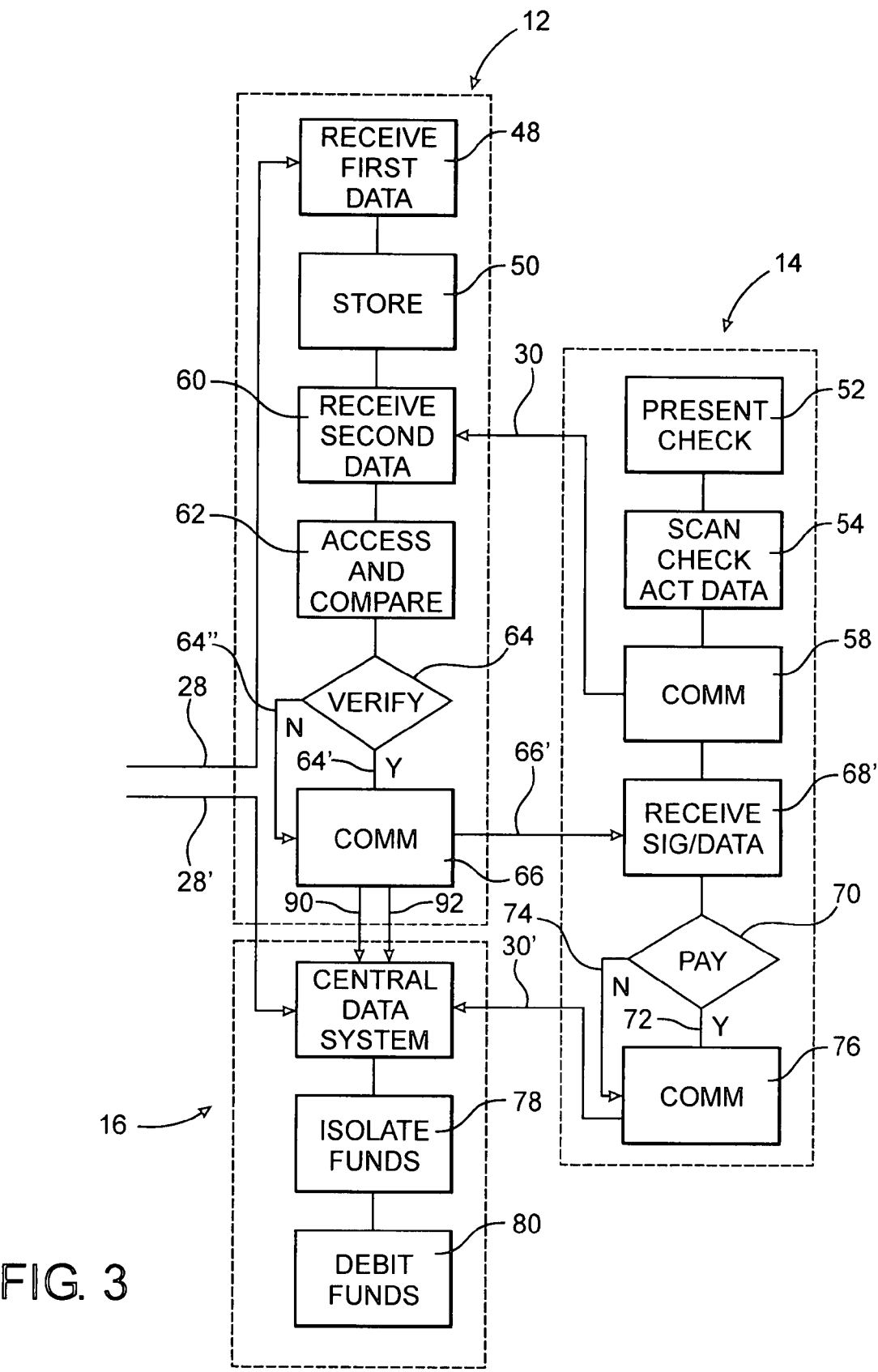
FIG. 3 is a flow chart schematically representing the various procedures in the performance of another preferred embodiment of the system and method of the present invention differing from that of the embodiment of FIG. 2.

FIG. 3 comprises a schematic representation of yet another preferred embodiment of the system and method of the present invention. This preferred embodiment differs from the embodiment of FIG. 2 primarily by defining the content of the first set of data to include both account data and payee data of given bank check and defining the second set of data to include at least account data but not necessarily the payee data that appears on the bank check at the time of redemption. In addition, a positive comparison or a negative comparison between the first and second sets of data at the processing center 12 by the central processing unit 24 will result in the communication as at 66 and 66' of "authenticating data" which is variable and which may differ from the communication of the verification signal 64' and the non-verification signal 64", as with the embodiment of FIG. 2.

More specifically, in order to facilitate verification procedures throughout the entire system and in particular those procedures involved at the cashing terminal or site 14, the second set of data preferably comprises the account data of the bank check at the time it is presented for redemption and is absent all or at least a portion of the payee data, such as the monetary amount of the check and the payee identification appearing of the check at the time of redemption. This will save time and effort of personnel at the cashing terminal or site 14 having to manually or otherwise enter any portion of the payee data as a part of the second set of data communicated to the processing site 12 as at 30 in FIG. 3.

Accordingly, the second set of data received by the processing site 12, as at 60 is stored in the central processing unit 24 and compared with a portion of the previously received and stored first set of data relating to the same or given bank check. Since the second set of data communicated to the processing center 12, as at 30 is absent all or at least a portion of the payee data, only the account data is directly compared with the account data included within the first set of data of a given bank check. If the account data of the first and second sets are not identical, a negative comparison occurs and the "authenticating data" communicated to the cashing terminal or site 14 as at 66 and 661 is in the form of a non-verification signal 64". The result of such a negative comparison between the account data of both the first and second set of data will in turn result in a refusal to pay or redeem the bank check presented at the cashing site 14, as at 74.

However, a positive comparison, resulting from the account data of the first and second sets of data being identical will result in the generation of "authenticating data" 64' communicated to the cashing terminal or site 14 as at 66 and 66' in the form of at least a portion of the payee data defining a part of the first set of data, determined at the issuing site 10, as described above. By way of example, the portion of the payee data communicated as at 66 and 66' to the cashing site 14 and received as at 68' may include the monetary value of the check or the identity of the payee or both, at the time the given check was issued at the issuing site 10.

Receipt of the authenticating data, resulting from a positive comparison of the first and second sets of data, as at 68' may be viewed or communicated to authorizing personnel, such as by the display 14' at the cashing site or terminal 14. The receiving personnel then merely has to visually compare the received portion of the payee data (monetary amount, payee identify or both) with the corresponding payee data appearing on the bank check presented for redemption. If these portions of the payee data are identical, the personnel at the cashing site or terminal 14 can interpret this as a verification signal and proceed with redemption of the presented check as at 70, 72.

The remaining procedures as described with reference to the embodiment of FIG. 2 are also applicable with the embodiment of FIG. 3 specifically, but not exclusively, relating to communication with the central data system 16 and the isolating and debiting of funds as at 78 and 80. Therefore, with each of the above noted preferred embodiments, initial communication with the central data system 16, for purposes of supplying the first set of data thereto, can occur between the processing center 12 and the central data system 16 as at 90 rather than having such communication occur directly between the issuing terminal 10 and the central data system 16 by the first communication link 28'.

Similarly once the presented check has been verified and authorized for payment at the cashing terminal 14, utilizing either of the preferred embodiments of FIG. 2 or 3, the processing center 12 can further provide instructions to the central data system 16, as at 92, for the purpose of debiting funds as at 80 from the isolated or suspended funds associated with the bank check. In this embodiment, perhaps additional security features would be added since the plurality of cashing sites or terminals 14 would not have any access to the account information of the payor.

As yet another preferred, alternate embodiment, the present invention contemplates the use of an identifying access code as at 82. The access code is assigned to the issuing company and/or payor for the purpose of identification and authorization by the payor and as set forth hereinafter, to link the payor's checks to the processing center 12. More specifically, if an issued check is cashed, or not registered or otherwise communicated to the processing center 12, any such check, later submitted for redemption to a cashing terminal 14, will of course not be verified since there would be no record at the processing center 12 of the existence of such a check and a person at the cashing terminal could not be notified of the status of that check. At that point either the cashing terminal 14 or the processing center 12 could communicate, by telephone communication or any other applicable means, with the issuing terminal 10 or personnel of the payor, located at the issuing site and attempt to identify the presented bank check, at least in terms of the account data and a portion of the individualized payee data. Proof that the data received by telephone from the payor was authentic would be verified by the payor supplying the identifying access code as at 82.

In addition to the above and as yet another alternate and preferred embodiment of the present invention, the check or other negotiable instrument attempting to be authenticated and cashed may be processed in a manner similar to that described above. More specifically in this preferred embodiment, the second set of data received by the processing site 12, as at 60, is stored in the central processing unit 24. However, this "second set of data", rather than being any portion of the account data or the payee data would be some other means of identifying, with certainty, the specific check or other negotiable instrument being processed. The second set of data, which may hereinafter be referred to as the "identifying data" may be derived from and/or correspond to "identifying information" disposed on and/or integrated into the check or other negotiable instrument. Accordingly the creation or generation of the identifying data is accomplished by scanning or otherwise manually inputting the identifying information.

Further, the identifying information may include, but is not intended to be limited to, a specific code similar to but possibly distinguishable from the access code 82 as described with reference to FIG. 2. Other identifying information for a specific negotiable instrument or check could be electronically implanted or integrated and as such the identifying information is capable of being accessible by scanning or optically reading. However, the versatility of the structuring and formatting of the identifying information on the negotiable instrument should be such as to allow it to be manually input and thereby communicated to the processing site 16 or other intended location in the form of the identifying data.

Regardless of its form, the identifying information should thereby be capable of being scanned, optically read or otherwise identified resulting in the creation or generation of the "identifying data". As set forth above, the previously, predetermined means of identification may also be manually inputted at the cashing terminal 14 by personnel. However, a more preferred modification of this preferred embodiment would be the optical or electronic scanning or reading in order that any type of typographical or other personnel errors may be avoided in entering the appropriate identifying data.

Once inputted, the identifying data would be compared with a portion of the data previously received and stored and recognized as a modification of the "first set of data" relating to the same negotiable instrument or bank check. Since the identifying data communicated to the processing center 12 as at 30 is absent both the payee data and the account data, as with the previously described embodiments, it is compared directly with "corresponding" identifying data transmitted to the processing center 12 by the issuing terminal as at 40 in FIG. 2, which may be considered a part of the first set of data as set forth above. It is again emphasized that more sophisticated scanning equipment as at 18 and 34 associated with the issuing terminal 10 and the cashing terminal 14, respectively may be required to accurately and reliably "read" the identifying data.

Therefore, as part of this preferred embodiment, the identifying data would be used to accurately and reliably identify a given negotiable instrument. Once identified and recognized, this identifying data would be communicated as at 58 to the processing center 12 as at 30. Instead of receiving the second set of data 16 as represented in FIGS. 2 and 3, the identifying data would be received. Upon receipt, the identifying data received from both the issuing site 10 and the cashing site 14 would be compared at the processing center 12. As a result, instead of a verification, non-verification signal being sent as at 64' and 64" from the processing center back to the cashing terminal 14, all or a predetermined portion of the account data and/or payee data would be communicated as at 66 and 66' back to the cashing terminal 14 where it could be displayed as at 14' to personnel associated with the cashing terminal. The personnel at the cashing terminal 14 would then compare the displayed data (account data and/or payee data) with corresponding data appearing on the negotiable instrument presented at that time for redemption. If the data displayed as at 14' correctly matched the data then appearing on the negotiable instrument presented for redemption, the check would then be cashed and/or paid as at 70. This embodiment could also include the further processing as in the previous embodiments at least in terms of communicating 76 with the central data system 16 as at 30'.

Yet another preferred and alternate embodiment of the present invention is a modification of the processing involved in the authentication and/or verification of a variety of negotiable instruments including but not necessarily limited to bank checks. It is emphasized that the term "negotiable instrument" is therefore meant to include currency, bank checks, money orders, certified checks, bearer bonds and a variety of other negotiable instruments commonly established and recognized in the banking, commercial and financial industries. More specifically, the scanners 18 and 30 respectively associated with the issuing site 10 and the cashing site 14 may be further developed to a more sophisticated operational or "read" level. More specifically, the scanners may be structured to recognize any of a variety of different negotiable instruments including currency, bank checks, etc., by means other than account data, payee data, authenticating data and identifying data as described with specific reference to the above-noted alternative embodiments of the present invention. Such additional means of recognition and authentication, other than an electronic or manual comparison of data would include, but most certainly not be limited to, the technology of the type developed by Applied DNA Sciences, Inc. of Los Angeles, Calif. This company has developed a proprietary, non-human DNA embedded security system which comprises the embedding of Applied DNA™ and/or Applied DNA Marker System™ into currency as well as other applications including a variety of negotiable instruments, printed materials, etc. Plant or textile DNA would serve as an identifying "marker" system which has or will be developed for practical use by inserting an applied DNA marker during the textile manufacturing process enabling more sophisticated scanner technology to identify both the country of origin as well as specific factories of manufacture where the product and/or components were produced, assembled or otherwise processed.

Further development indicates the ability to integrate into the cotton fibers used to print currency as well as other substrate material for stamps and other printed security documents as a covert and forensic marker. The program and technology would provide a cost effective solution as the marker will be applied during the security printing and/or currency manufacturing process. Further, a proprietary DNA embedded biotechnology serves as a security solution, using non-human DNA, that will verify the authenticity and protect corporate and government agencies from counterfeiting, fraud, piracy, product diversion, identify theft, and unauthorized access.

Therefore, this additional preferred and alternative embodiment of the present invention would involve the use of DNA as the above described "identifying information" embedded or otherwise integrated in the various types of negotiable instruments being processed in accord with the present invention in order to accomplish an efficient and reliable authentication and/or verification thereof. Therefore, the identifying of negotiable instruments including currency, bank checks, etc., by means other than by scanning, reading or manually inputting account data, payee data, authenticating data, etc. is a feature that distinguishes this embodiment from those described above. More specifically, embedded or integrated DNA would be scanned using even more sophisticated scanner technology which is also schematically represented as scanner 18 associated with the issuing site 10 and the scanner 34 associated with the cashing site 14.

Yet another preferred embodiment of the present invention which can be used in combination with any of the above-noted embodiments is provided in order to conform to new Federal Reserve rules relating to the physical transportation and processing of bank checks and/or other negotiable instruments. More specifically, prior to the implementation of the new Federal Reserve rules, checks, once redeemed, were physically transported back to the bank of origin on which they were drawn, after being physically processed by the appropriate Federal Reserve facilities. Such physical transportation and processing of course involved excessive time, labor and costs based on the extremely large volume of checks that are handled in the United States on a daily basis. As now allowed and provided by the Federal Reserve, physical processing of individual hard copy bank checks is no longer required. Therefore, with primary reference to FIG. 3A, once a check has been authorized and paid as at 70, such as at the cashing terminal or site 14, additional communication such as at 80 can be made to a scanner assembly 82 for purposes of completely scanning one or both sides of the bank check which has been redeemed. Such scanning should have sufficient capabilities and sophistication to collect all information and data sufficient to satisfy the Federal Reserve rules relating to these matters. Once so scanned, the collected data and/or information are used to create an electronic "substitute check" as at 84. As indicated, the substitute check 84 can be electronically created and as such be communicated for further processing as at 86 by the electronic delivery of the substitute check 84 to the bank on which it was originally drawn. Thereafter a hard copy can be created using appropriate printers, optical scanners, etc. wherein the hard copy print of the check, rather than the original check, is returned to the payor through the bank on which it has been drawn. Therefore, the electronic transfer and processing of the data and information contained on and defining the electronic substitute check will conform to the Federal Reserve rules and save time, labor and costs previously associated with the physical processing, transporting and delivery of the original checks.

Figure 3A:
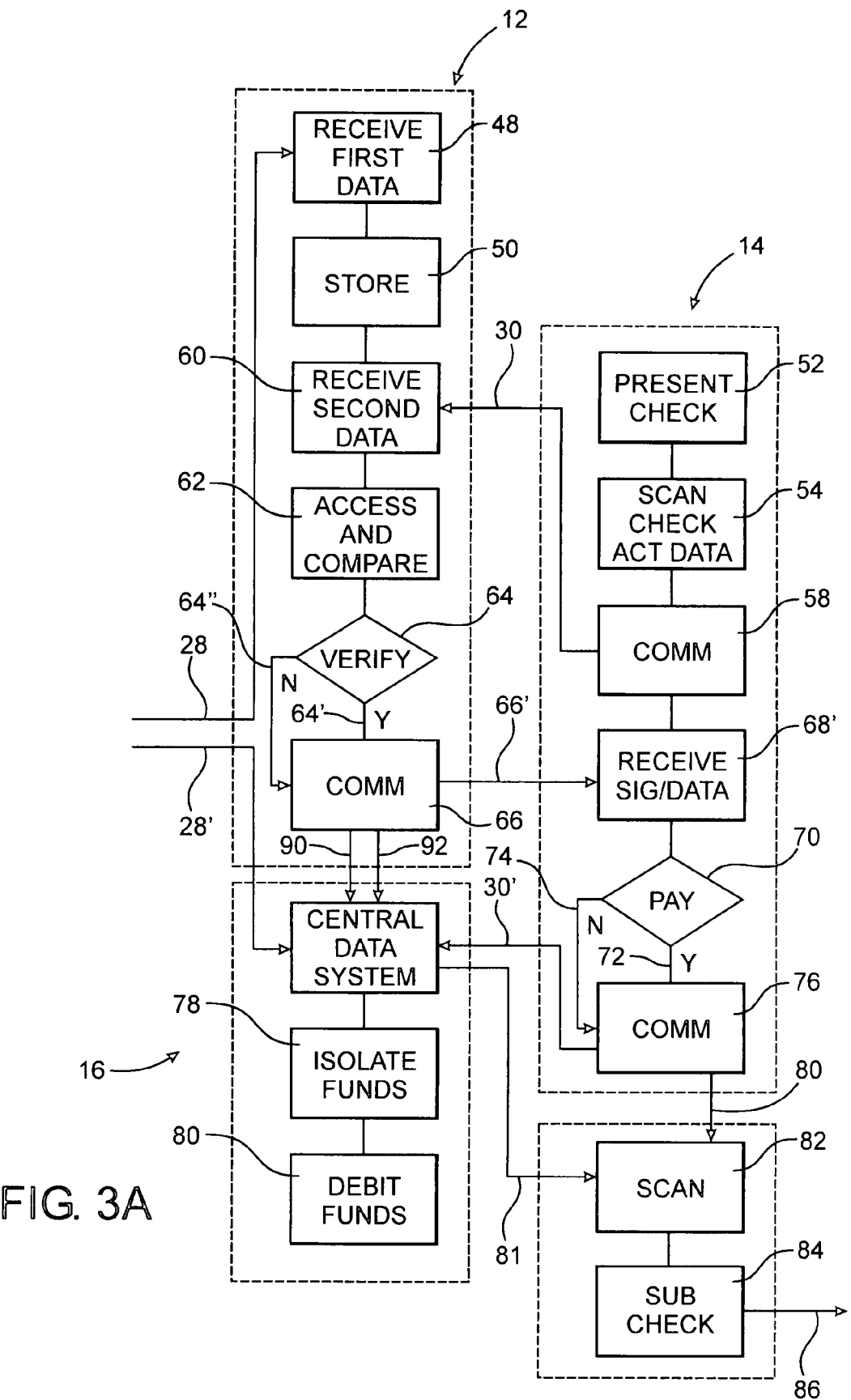
FIG. 3A is a flow chart schematically representing the various procedures and the performance of yet another preferred embodiment of the system and method of the present invention differing from that of the embodiment of FIGS. 2 and 3.

In the implementation of this alternate, preferred embodiment, the scanning 82 can take place at the cashing terminal 14, and/or the central data system 16 and/or otherwise be associated therewith as indicated at 81 in FIG. 3A. Therefore, the scanning of appropriate information to satisfy the Federal Reserve rules is not limited to an off-site scanning facility or location but may be a part of the cashing site 14, the central data system 16, the processing center 12, the issuing site or terminal 10 and/or a combination thereof.

In addition to the above, additional security features may be incorporated which include some or all of the operational features of the above-described preferred embodiments such as, but not limited to, a situation where the negotiable instrument to be processed and or authenticated is a particularly high dollar amount. As with the other of the above described embodiments of the present invention, the term "negotiable instrument" is not limited to a bank check but can be any type of instrument or financial application as recognized in the banking, financial, or commercial industries. Such negotiable instruments can be currency, bank checks, bearer bonds, common bonds, and a variety of other instruments.

Figure 4:
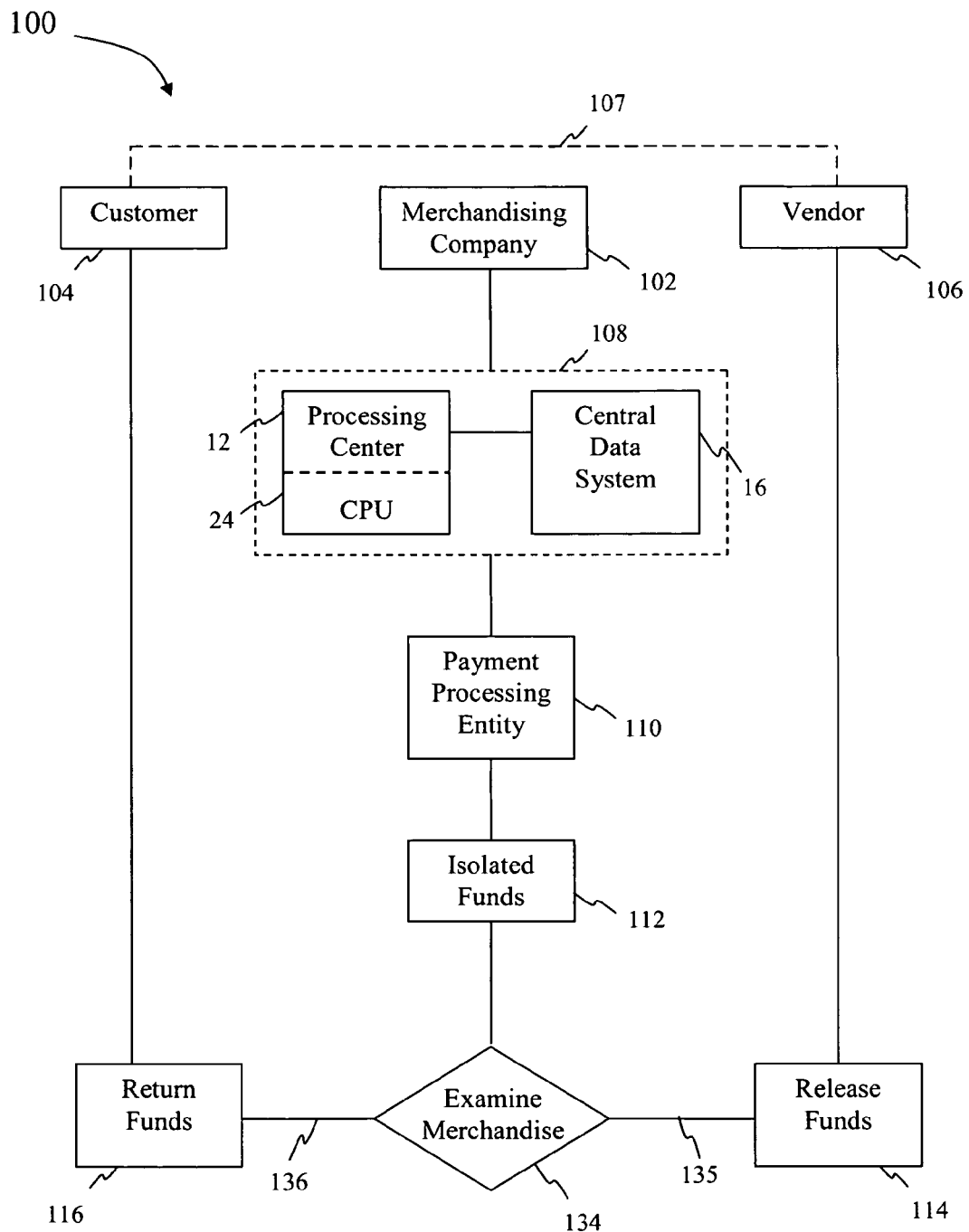
FIG. 4 is a schematic representation in block diagram form of another preferred embodiment of the present invention directed to a system and method for assuring payment for and receipt of merchandise in a commercial transaction between a customer and a vendor.
Figure 5:
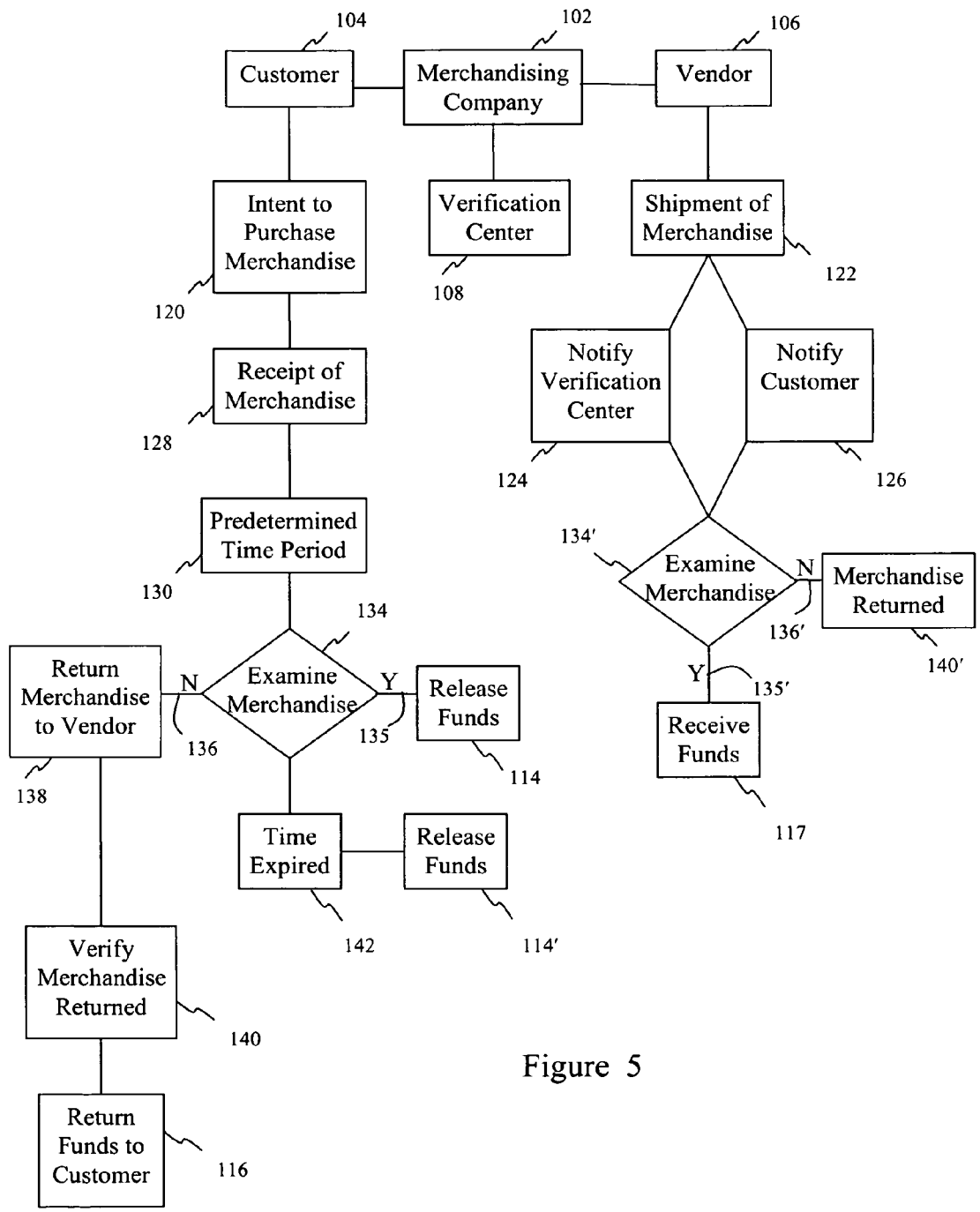
FIG. 5 is a flow chart schematically representing yet another embodiment of the present invention directed to a method of practicing the system of the embodiment of claim 4.

Additional preferred embodiments of the present invention are schematically represented in block diagram form in FIGS. 4 and 5. Moreover, these additional embodiments comprise a method and system for assuring payment for and receipt of merchandise in a commercial transaction of the type which is customarily, but not exclusively, conducted over the Internet or other appropriate communication network. As such, both the system and method are collectively and generally indicated as 100. When conducted over the Internet or other appropriate communication network, the commercial transaction may be accomplished through or in cooperation with a merchandising company 102 such as, but not limited to, the type commonly and commercially known as eBay™. It is emphasized the term "merchandising company" is meant to be a generic description of any of a variety other types of intermediate companies accessible on the Internet or different communication networks, which serve to advertise/sell merchandise. As such, the merchandising company 102 is available for communication with both a customer 104 and a vendor 106. Moreover, the operational and structural features associated with the merchandising company 102 may vary extensively dependent upon the communication network utilized to communicate with either or both the customer 104 and vendor 106.

For example, when the merchandising company 102 communicates by means of the Internet, it will undoubtedly include an accessible website, wherein various features of the merchandise offered for sale will be displayed, advertised or made available. However, when the preferred communication network is other than the Internet, such as a television or telephone network, etc., various operative and structural features of merchandising company 102 may differ while still functionally performing the intended services associated with facilitating completion of an intended commercial transaction between a customer 104 and the vendor 106.

In addition, the system and method 100 of the present invention further comprises the inclusion of a verification center 108 which in turn may include one or more operative components. As such, the central data system 16 operates at least partially in the manner set forth and described with regard to the embodiments of FIGS. 1 through 3A as described in detail herein. Further, the central data system 16 may be used independently and therefore define a primary component of the verification center 108. Alternatively, the verification center 108 may include a processing center 12 which also incorporates an appropriate central processing unit 24. As with the embodiments of FIGS. 1 through 3A, the processing center 12 will thereby serve to facilitate communication between the verification center 108, and more specifically the central data system 16, and the customer 104, vendor 106, merchandising company 102 and/or a payment processing entity 110. As will be explained in greater detail hereinafter, specifically with the operational procedure associated with the schematically represented method of FIG. 5, communication between the verification center 108 and a payment processing entity 110 may be accomplished independently by the central data system 16 or in cooperation with the processing center 12 and its affiliated central processing unit 24.

More specifically, the verification center 108, incorporating either the central data system 16 independently or in cooperation with the processing center 12 is structured to establish interactive operation with the payment processing entity 110. Payment processing entity 110 is a generic description for a bank, credit card company or like entity capable of processing a "payment medium" and in particular, but not limited to, a payment medium in the form of a credit card, debit card, gift card, smart card or other primarily credit instrument commonly used in commercial transactions throughout the world. In its intended capacity, the payment processing entity 110 is meant to accomplish the processing of the presented payment medium (credit card, etc.) received from the customer 104, at least to the extent of debiting the monetary amounts substantially equal to the purchase price and possibly any service fees, etc. associated with the commercial transaction, once it is completed. Accordingly, the verification center 108 is not primarily responsible for accomplishing the actual processing of the payment medium in terms of debiting the purchase price from the offered or communicated payment medium. Such procedural activity is left to the payment processing entity 110 which it may conduct in a substantially traditional manner. However, interactive cooperation between the verification center 108 and the payment processing entity 110 involves the temporary isolation of funds, as at 112. As used herein, the isolated funds 112 comprise a monetary amount equal to the purchase price and possibly any associated service fees or charges, the transfer of which will be temporarily delayed, until released as at 114, when all of the conditions of the commercial transactions between the customer 104 and the vendor 106 have been completed. Thereafter, as generally represented in FIG. 4 and described in greater detail in FIG. 5, the isolated funds 112 may be eventually released to the vendor as at 114 upon acceptance of the merchandise by the customer 104. Alternatively, the isolated funds 112 may be returned as at 116 to the customer 104 if the merchandise is unacceptable and/or otherwise timely rejected by the customer 104, in accord with the conditions of the original commercial transaction.

As also represented in FIG. 4, the commercial transaction may take place between a customer 104 and a vendor 106 absent the presence or interaction of an auxiliary, merchandising company 102. In such an instance, the customer 104 and the vendor 106 may communicate directly with one another, as at 107, utilizing any appropriate communication network such as the Internet, telephone communication, direct contact, such as by the customer 104 visiting the location of the vendor 106, etc.

With further regard to the operational details of the method and system 100 of the present invention, reference is made to both schematic representations presented in FIGS. 4 and 5. As such, it is presumed that the customer 104 communicates the intent to purchase merchandise, as at 120, from the vendor 106, either by direct communication 107 with the vendor 106 or alternatively by conducting the commercial transaction through the utilization of a merchandising company 102, of the type set forth above. Assuming the latter scenario, the merchandising company 102 will be contacted by the customer 104 as to the intent of the customer 104 purchasing predetermined merchandise, as at 120. In turn the merchandising company 102 may communicate such intent to purchase to the vendor 106. Additional communication between the customer 104 and the merchandising company 102 will include the transfer or communication of a "payment medium" such as, but not limited to, a preferred credit instrument, of the type set forth above. In turn, merchandising company 102 and/or alternatively, the customer 104 and the vendor 106, will communicate with the verification center 108 for purposes of further conducting the commercial transaction and assuring that various features or conditions of the commercial transaction are completed as intended. As set forth above, the verification center 108 at least includes the central data system 16 or alternatively, includes the processing center 12 and its associated central processing unit 24 to further facilitate communication with the central data system 16.

In order to further facilitate efficiency and security during communication between the customer 104, vendor 106, verification 108 and/or payment processing entity 110, an identifying and/or security code may be assigned to and used by the customer 104. As such, the identifying code may include identification data or information relating to the customer, the merchandise, the vendor, the purchase price, the payment medium and/or other details relating to the commercial transaction being conducted.

Once the intent to purchase, as at 120, has been communicated to the vendor 106 either directly, by the merchandising company 102 and/or more preferably by the verification center 108, the vendor 106 arranges for the shipment or delivery of the merchandise as at 122. Upon such arrangement, the vendor 106 will notify the verification center 108 as at 124 and also notify the customer 104 as at 126. Such notification to the verification center 108 as well as the customer 104 will be for purposes of determining an intended arrival date of the merchandise to the customer 104. Such arrival date can be established, determined and/or verified utilizing a tracking system and/or like facility associated with various commercial or common carriers, of the type well known in the transportation industry.

Upon receipt of the goods, as at 128, by the customer 104, a predetermined time period 130 will begin to run. This predetermined time period 130 may be any feasible time period such as a predetermined number of consecutive days, weeks, months, etc. and is agreed upon or recognized as part of the commercial transaction between the customer 104, vendor 106 and established directly therebetween or by means of the merchandising company 102. In the mean time, the payment processing entity 110 will have received or otherwise be authorized to access the payment medium communicated to the verification center 108 or the vendor 106 by the customer 104. Funds comprising a predetermined monetary amount corresponding at least to the purchase price will be deducted from the payment medium (credit card, etc.) and "isolated", as at 112. Such isolated funds will remain until all terms of the commercial transaction have been completed in the intended manner. Isolation of the funds 112 is accomplished by interactive operation of the verification center 108 and in particular the central data system 16, in a manner similar to that described above with regard to the embodiments of FIGS. 1 through 3A, with one apparent difference being that in the preferred embodiments of the system and method 100, the payment medium offered by the customer 104 will most probably be in the form of a credit instrument, as set forth above. In accord with operational and structural features of the central data system 16 as set forth above and as at least partially utilized in the system and method 100, isolation of the funds or predetermined monetary amount will be on a temporary basis and be either released to the vendor 106, as at 114, or returned to the customer 104, as at 116, as will be explained in greater detail hereinafter.

With further reference primarily to FIG. 5, during the predetermined time period 130, the customer 104 has the ability, as well as the responsibility, to view and/or examine the merchandise once it is received, as at 134, and make a decision of either accepting the merchandise or rejecting the merchandise. Accordingly, during the examination 134 and within the agreed upon time period 130, the customer may accept the merchandise, as at 135, wherein the isolated funds 112 are released, as at 114 to the vendor 106. The release of the isolated funds 114 is accomplished by the interactive operation of the verification center 108 and the payment processing entity 110. In contrast, if the customer's examination of the merchandise 134 results in the rejection of the merchandise, as at 136, and such rejection is within the predetermined time period 130, arrangements will be made to return the merchandise, as at 138, to the vendor 106. Once it has been established that the merchandise has been returned, as at 140, in good or original condition, the funds will be returned to the customer 104, as at 116.

Therefore, from the vendor's point of view, if the merchandise is accepted by the customer, after examination by the customer as at 134', and within the predetermined time period 130 as at 135', the vendor 106 will eventually receive the isolated funds 112, as at 117. However, in the event that the merchandise is rejected by the customer 104, as at 136', and such rejection is within the predetermined time period 130, the merchandise will or should be eventually returned to the vendor as at 140'.

Yet another feature of the system and method 100 of the present invention places a certain responsibility on the customer 104 to examine the merchandise 134 and either accept or reject the merchandise, as at 135 or 136, within the predetermined time period 130. However, if the customer 104 delays or fails to either accept or reject the merchandise during the examination period 134 and within the time period 130, the time period 130 will have expired as at 142 and the isolated funds 112 will be released as at 114' to the vendor 106. Therefore, it is apparent that the responsibility of the customer 104 to act by either accepting 135 or rejecting 136 the reviewed merchandise 134 within the predetermined time period 130 is paramount to conducting the intended commercial transaction in an intended manner. Failure to either accept or reject the merchandise as at 135 and 136 within the predetermined time period 130 results in the isolated funds 112 being released as at 114' to the vendor 106 through interactive operation between the verification center 108 and the payment processing entity 110.

Therefore, the verification center's 108 interactive operation with the payment processing entity 110 will serve to release the isolated funds 112 to the vendor 106 if the customer either accepts the merchandise 135 within the predetermined time period 130 or alternatively fails to reject the merchandise within the predetermined time period 130, allowing the time to expire, as at 142. However, in contrast, the verification center 108 and the payment processing entity 110 serves to interactively operate with one another to return the isolated funds 112 to the customer 104 provided the customer 104 rejects the merchandise 136 within the predetermined time period 130, and further provided that the merchandise is returned in original or acceptable condition, as at 140'.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for assuring payment for and receipt of merchandise involved in a commercial transaction between a customer and a vendor, said system comprising:
    a merchandising company structured to establish communication with the customer and the vendor and advertise merchandise for sale over a predetermined communication network,
    a verification center including at least a central data system and structured for communication with the customer and the vendor,
    a payment processing entity structured to process a payment medium presented by the customer as payment for merchandise being purchased,
    said verification center and said payment processing entity cooperatively interactive to isolate a monetary amount corresponding to the payment for the merchandise,
    said verification center structured to release the isolated monetary amount to the vendor upon the customer either accepting or failing to reject the merchandise within a predetermined time period, and
    said verification center structured to return the isolated monetary amount to the customer upon the customer rejecting the merchandise within the predetermined time period.

2. The system as recited in claim 1 wherein the verification center further comprises a processing center, said processing center structured for communication with said central data system.

3. The system as recited in claim 2 wherein said processing center is structured for communication with at least the customer.

4. The system as recited in claim 3 wherein said processing center is structured for communication with the vendor.

5. The system as recited in claim 3 wherein said data processing system is structured for communication with said payment processing entity for isolation of the monetary amount.

6. The system as recited in claim 5 wherein said data processing system is structured for release of said isolated monetary amount to the vendor.

7. The system as recited in claim 6 wherein said data processing system is structured for return of said isolated monetary amount to the customer.

8. The system as recited in claim 1 wherein said data processing system is structured for communication with said payment processing entity for isolation of the monetary amount.

9. The system as recited in claim 8 wherein said data processing system is structured for release of said isolated monetary amount to the vendor.

10. The system as recited in claim 9 wherein said data processing system is structured for return of said isolated monetary amount to the customer.

\* \* \* \* \*